April 25, 1961 E. AGALIDES ET AL 2,981,893
BISTABLE MULTIVIBRATOR UTILIZING MILLER INTEGRATORS
TO REGULATE OUTPUT FREQUENCY
Filed March 10, 1960
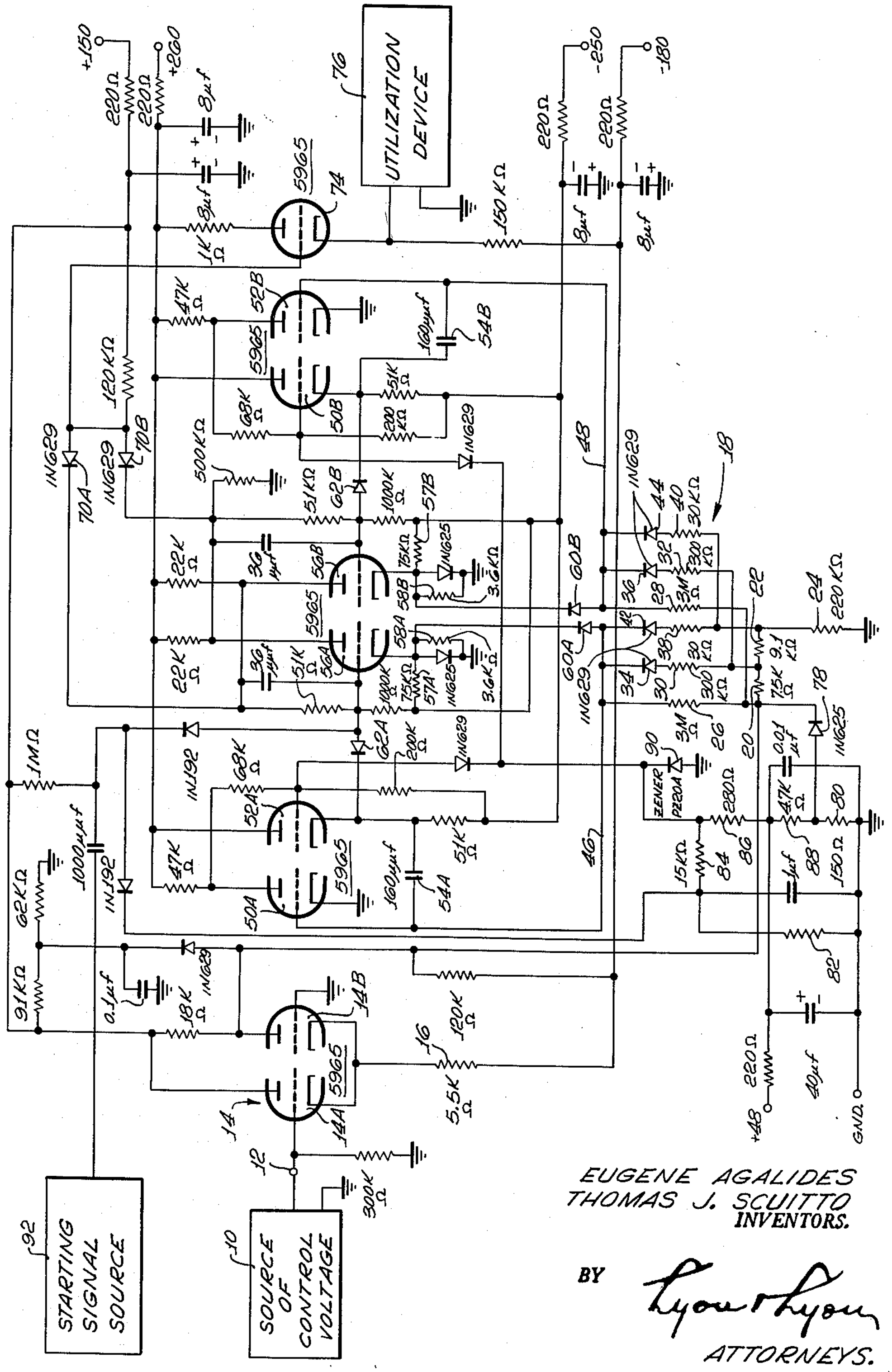
EUGENE AGALIDES
THOMAS J. SCUITTO
INVENTORS.
BY Lyon & Lyon
ATTORNEYS.

United States Patent Office 2,981,893

Patented Apr. 25, 1961

2,981,893

BISTABLE MULTIVIBRATOR UTILIZING MILLER INTEGRATORS TO REGULATE OUTPUT FREQUENCY

Eugene Agalides, Rochester, N.Y., and Thomas J. Scuitto, Santa Monica, Calif., assignors to General Dynamics Corporation, Rochester, N.Y., a corporation of Delaware Filed Mar. 10, 1960, Ser. No. 14,089

7 Claims. (Cl. 328—206)

This invention relates to voltage-controlled oscillators and, more specifically, to improvements therein.

An object of this invention is the provision of a novel voltage-controlled oscillator circuit which has an extremely wide frequency range.

Another object of the present invention is the provision of a novel voltage-controlled oscillator circuit having a linear response to variations in the control voltage.

Yet another object of the present invention is the provision of a novel and useful voltage-controlled oscillator.

These and other objects of the invention are achieved by utilizing a bistable multivibrator and two integrators. The two amplifying devices of the bistable-state multivibrator are respectively coupled to the two integrators to alternately enable these integrators to receive a control voltage as each amplifying device successively becomes conductive. As each integrator receives its control voltage, it commences to charge up a capacitor. The charging continues until the capacitor charge reaches a value sufficient to trigger to its nonconduction state the amplifying device, from which the integrator is being enabled. Thereby, the other amplifying device is rendered conductive, and the control voltage can be applied to the other integrator to cause it to charge up its capacitor until the triggering level is reached.

The control voltage is initially applied to a direct-coupled amplifier, the output of which is connected to an exponential network. The output from the network is connected to apply current to both integrators. Effectively, therefore, the interchange of conduction and nonconduction by the two amplifying devices in the multivibrator varies directly with the amplitude of the control voltage. Output is taken from the bistable-state multivibrator.

The novel features that are considered characteristic of this invention are set forth with particularity in the appended claims. The invention itself, both as to its organization and method of operation, as well as additional objects and advantages thereof, will best be understood from the following description when read in connection with the accompanying drawing, which is a circuit diagram of an embodiment of the invention.

Referring now to the drawing, there may be seen a circuit diagram of an embodiment of the invention. It is to be noted that the values of the various components employed therein are shown in the circuit diagram by way of illustration of an operative embodiment of the invention. Therefore, these values are not to be construed as establishing a limitation upon the invention. There is shown in the circuit diagram a control voltage source 10 from which there may be derived the voltage which is to control the frequency of the oscillator. This is applied to an input terminal 12, which is connected to the control grid of a direct-coupled amplifier 14. This direct-coupled amplifier includes two tubes, respectively 14A, 14B. Tube 14A has applied to its control grid the control voltage from the source 10. It has its cathode connected to the cathode of tube 14B and to a common cathode load 16. Tube 14B is connected in grounded-grid fashion. Output is taken from the anode of tube 14B. This output is applied to an exponential network 18, which includes a plurality of resistors and diodes.

In the exponential network 18 there are three resistors 20, 22, 24, which are connected in series with each other and to ground. Two similar networks are connected from the top of resistor 20, from the junction between resistors 20 and 22, and from the junction between resistors 22 and 24, to derive current therefrom. Two resistors 26, 28 are connected to one side of resistor 20. Two resistors 30, 32, respectively in series with diodes 34, 36, are connected to the junction between resistors 20 and 22; and two resistors 38, 40, respectively in series with diodes 42, 44, are connected to the junction between resistors 22 and 24. A line 46 is connected to the other end of resistor 26 and to the diodes 34 and 42; a line 48 is connected to the resistor 28 and the other ends of diodes 36 and 44. This completes the exponential network.

Also included in the embodiment of the invention are two integrators. These are preferably, although not necessarily, of the well-known Miller integrator type. Each Miller integrator respectively includes an input tube 50A, 50B. The anodes of the input tubes 50A, 50B are direct-coupled to the control grids of tubes 52A and 52B. Tubes 52A and 52B are connected as cathode-follower tubes. Their respective cathodes are connected back to the control grids of the input tubes through the respective capacitors 54A, 54B. It should be noted that the lines 46, 48 are respectively connected to the control grids of the input tubes 50A, 50B also, and that is how the control voltage from the source 10 is applied to the Miller integrators. This control voltage is amplified by the respective tubes 50A, 50B and applied to the cathode-follower tubes 52A, 52B. These tubes then begin to charge the capacitors 54A, 54B, which degenerates the effect of the source voltage in a manner such as to cause the rise time of the voltage appearing at the cathodes of tubes 52A, 52B to be inversely proportional to the current injected at the grids of tubes 50A, 50B. The voltage on the capacitors 54A, 54B can build up with time, if permitted, in view of the cumulative action just described.

There is also included in the embodiment of the invention a flip-flop circuit or bistable-state multivibrator, which includes two amplifier tubes 56A, 56B. These tubes are cross-connected in classic multivibrator fashion, so that when one of them, for example tube 56A, is conducting the signal applied from its anode to the control grid of tube 56B will maintain that tube nonconductive, and vice versa. Cathode load resistors 58A, 58B are respectively connected between the cathodes of the tubes 56A, 56B and ground. Connection is respectively made through two diodes, respectively 60A, 60B, from the respective cathodes of the tubes 56A, 56B, to the lines 46, 48. Thus, effectively, the cathodes of the respective amplifier tubes 56A, 56B of the multivibrator are also coupled to the Miller integrator circuits. The cathodes of the respective cathode-follower tubes 52A, 52B are also coupled to the control grids of the respective amplifier tubes 56A, 56B of the multivibrator through diodes, respectively 62A, 62B. 75-kilo ohm resistors 57A, 57B are tied to the cathodes of tubes 56A, 56B and then to the negative-supply voltage to provide negative bias at the cathode of the nonconducting tube in the flip-flop.

Assume, now, that the flip-flop amplifier tube 56A is in its conductive state and tube 56B in its nonconductive state. The control grid of tube 56A, and thus the diode 62A, are connected to the anode of tube 56B, which is essentially positive relative to the anode of tube 56A. However, current cannot flow through the diode 62A at this time because the cathode of tube 52A is biased more positively than the value of the potential at the anode of tube 56B. The cathode of the nonconducting tube 56B is negative, and thus diode 60B can conduct any current being received from the network, including resistors 28 and diodes 36, 44. When the tube 56A is rendered conductive, its cathode goes positive from a negative value, thereby blocking diode 60A. Current can flow from the exponential network into line 46, thereby applying a positive current to the control grid of tube 50A. This results in the cathode-follower tube 52A beginning to charge the capacitor 54A negatively. As the charge on the capacitor 54A increases as a result of the integrating operation of the circuit, the cathode of tube 52A becomes more and more negative. When it becomes sufficiently negative, current flows through diode 62A, pulling the control grid of tube 56A negative and rendering tube 56A nonconductive. Thus, when the charge on capacitor 54A reaches a triggering level, conduction in the tube 56A is cut off and conduction can then occur by flip-flop action in tube 56B. The process just described then occurs with the second Miller integrator in conjunction with the tube 56B. When a control voltage is received from the source 10, this voltage is applied through the resistors 26 and 28 to the respective Miller integrator inputs. This will cause either the capacitor 54A or 54B, respectively, to be charged at a rate, the slope or rate of increase of which is determined by the amplitude of the control voltage being applied. The integrator circuit which charges its capacitor is the one associated with the conductive flip-flop stage. It will be appreciated that the triggering level for the respective flip-flop amplifier tubes is attained more rapidly and the flip-flop will be driven from one to the other state of stability at a rate which is linearly related to the amplitude of the control voltage being applied. When the one or the other of the amplifying stages in the flip-flop is rendered nonconductive, the capacitor in the associated integrating circuit can dissipate its charge through either the diode 60A and 60B which is now connected to a negative cathode.

It will be appreciated that the one of the cathodes in the flip-flop circuit which is positive (at ground potential) effectively applies such potential to the line connected between it and the control grid of the Miller integrator tube. Until this potential value is exceeded by the value of the control voltage being applied to the exponential network, the diodes in that network cannot conduct. Thus, for example, assuming that tube 56A is conductive, the control voltage being applied through resistors 30 and 38 to the respective diodes 34 and 42 will not be sufficient to enable current to flow through these diodes until this voltage exceeds the voltage at the cathode of tube 56A.

In view of the selection of resistance values in series with diodes 34 and 42, effectively diode 34 will break down first, and diode 42 second as the amplitude of the voltage increases over certain predetermined levels. A similar operation occurs with diodes 36 and 44. In the embodiment of the invention shown, when the voltage applied is insufficient to cause current flow through the diodes 34 and 42 or 36 and 44, variation of the voltage being applied from the control source can cause a variation in frequency obtained in response of ten to one. When the applied voltage increases sufficiently to cause current flow through diodes 34 and 36, the frequency range is variable with variations in voltage over a range of one hundred to one. When the level of the voltage being applied is sufficient to cause conduction through diodes 42 and 44, the frequency range is one thousand to one with variations in input control voltage. In an embodiment of the invention which was built employing the circuit components shown in the drawing there was obtained a frequency range from 200 to 250,000 pulses per second, with a square-wave output that had an almost constant rise time over the frequency range, which made it easy to form constant amplitude pulses by differentiating.

Output from the circuit is derived from the respective anodes of the flip-flop tubes 56A, 56B through an OR gate, which is effectively comprised by diodes 70A and 70B having their cathodes connected to their respective anodes of tubes 56B, 56A, and their anodes connected together to the control grid of a cathode-follower output tube 74. The cathode of this tube is connected to a utilization device 76.

A diode 78 clamps the top, or end, of resistor 20 through a resistor 80 to ground, to prevent a negative voltage from appearing across resistors 20, 22, and 24. The network of resistors 82, 84, 86, and 88 which are connected in series and have their center point connected to a Zener diode 90, which is connected to ground, are provided for the purpose of providing a stable bias voltage for the control grids of the tubes 52A and 52B.

The values of the resistors and capacitors in the Miller integrator and multivibrator circuits can be changed to extend or modify the frequency range to be covered in response to the control-voltage input. Transistors may be employed in place of tubes. If, instead of a steady-state control voltage, pulses or sinusoidal or square-wave signals are applied to the input of the oscillator, the output which is obtainable from the flip-flop circuit will be a multiple of the input frequency. If desired, a half-frequency value can be obtained by taking output from only one of the amplifiers in the flip-flop circuit, instead of from both. Furthermore, the circuits described herein can be used for converting a voltage input into an analog output, since the frequency of the output represents amplitude of the input voltage.

A starting signal source 92 may be employed if, when the apparatus is first turned on, it is desired to commence operation substantially immediately without waiting for a first integration operation. This applies a voltage to the control grid of tube 56A to place it in its nonconductive condition.

There has accordingly been shown and described herein a novel and useful voltage-controlled oscillator wherein the frequency of oscillation of a flip-flop circuit is determined by two integrator circuits, respectively coupled to the two stages of the flip-flop circuit to control their conductive states. A control voltage is applied to the inputs to the respective integrator circuits through a network whereby whenever the control voltage exceeds certain predetermined levels more current can be applied to the integrator circuits for the purpose of increasing the slope of the charge rate of the capacitor in the integrator, and thereby obtaining a greater increase for given changes of voltage from the control voltage source of frequency changes of the flip-flop circuit. In other words, for changes in voltage occurring below the level of conduction through diodes 34 and 42 and 36 and 44, the corresponding changes in output frequency will have one value. When diodes 34 and 36 are rendered conductive, a greater change in frequency in response to the same voltage amplitude change is obtained, and when diodes 42 and 44 are conductive, a still greater change in frequency in response to the voltage change occurs.

We claim:

1. A voltage-controlled oscillator comprising a flip-flop circuit including a first and second amplifying device and means for cross coupling said amplifying devices for rendering one of them nonconductive when the other is conductive and vice versa, a first and second integrating circuit each respectively including a first and second capacitor, means for applying a control voltage to the inputs to said first and second integrating circuits to charge up said first and second capacitors responsive thereto, means respectively coupling said first and second integrating circuit inputs to said first and second amplifying devices for preventing the application of said control voltage to the one of said integrating networks connected to a nonconducting one of said amplifying devices, means for coupling said first capacitor to said first capacitor to said first amplifying device to render it nonconductive when the charge on said first capacitor exceeds a triggering level, and means for coupling said second capacitor to said second amplifying device to render it nonconductive when the charge on said second capacitor exceeds a triggering level.

2. A voltage-controlled oscillator as recited in claim 1 wherein said means to apply a control voltage to said first and second integrating network inputs includes a direct-coupled amplifier to which said control voltage is applied, and an exponential nework coupling the output of said direct-coupled amplifiers to said respective first and second integrating network inputs.

3. A voltage-controlled oscillator comprising a flip-flop circuit including a first and second amplifying device each having an output and a control electrode, and means for cross coupling said output and control electrodes for rendering one of them conductive when the other is nonconductive, a first and second integrating network each respectively including a first and second capacitor, means for applying a control voltage to the inputs to said integrating circuits to charge up said first and second capacitors responsive thereto, a first and second diode, means for coupling said first diode between said first capacitor and the control electrode of said first amplifier, means for coupling said second diode between said second capacitor and the control electrode of said second amplifier, means for biasing said first and second diodes to be nonconductive until the value of the charges on said respective first and second capacitors exceeds an amplitude level the application of which renders a conductive one of said amplifiers nonconductive, and means respectively coupling said first and second integrating network inputs to said first and second amplifying devices for preventing the application of said control voltages to the one of said integrating networks connected to a nonconducting one of said amplifying devices.

4. A voltage-controlled oscillator as recited in claim 3 wherein each of said first and second integrator networks is a Miller integrator circuit including an input tube, a cathode-follower output tube connected to be driven from said output tube, and said first and second capacitors respectively are coupled between the outputs of said respective cathode-follower output tubes and the input tubes to drive said input tubes.

5. A voltage-controlled oscillator as recited in claim 3 wherein said means respectively coupling said first and second integrating circuit inputs to said first and second amplifying devices for preventing the application of said control voltages to the one of said integrating networks connected to a nonconductive one of said amplifying devices includes a third and fourth diode respectively connected between said first and second integrating circuit inputs and said first and second amplifiers, and means in said respective first and second amplifiers for respectively biasing said third and fourth diodes to be conductive when said respective third and fourth diodes are nonconductive.

6. A voltage-controlled oscillator as recited in claim 3 wherein said means to apply a control voltage to said first and second integrating network inputs includes an exponential network having a first, second, and third resistor connected in series and across which said control voltage is applied, a fifth and sixth resistor connected from one end of said first resistor and the respective inputs to the first and second integrating networks, seventh and eighth resistors, fifth and sixth diodes, means connecting said sixth resistor and fifth diode in series and between the junction of said first and second resistor and said first integrating network input, means connecting said seventh resistor and sixth diode in series and between the junction of said first and second resistor and said second integrating network input, eighth and ninth resistors, seventh and eighth diodes, means connecting said eighth resistor and seventh diode in series and between the junction of said second and third resistor and said first integrating network input, and means connnecting said ninth resistor and eighth diode in series and between the junction of said second and third resistor and said second integrating network input.

7. A voltage-controlled oscillator comprising a flip-flop circuit including a first and second amplifier tube each having an anode, cathode, and control-grid electrode, means for cross coupling said output and control electrode for rendering one of them conductive when the other is nonconductive, a first and second integrating network each respectively including a first and second capacitor, means for applying a control voltage to the inputs to said integrating circuits to charge up said first and second capacitors responsive thereto, a first and second diode, means for coupling said first diode between said first capacitor and the control electrode of said first amplifier, means for coupling said second diode between said second capacitor and the control electrode of said second amplifier, means for biasing said first and second diodes to be nonconductive until the value of the charges on said respective first and second capacitors exceeds an amplitude level the application of which renders a conductive one of said amplifiers nonconductive, means respectively coupling said first and second integrating network inputs to said first and second amplifying devices for preventing the application of said control voltages to the one of said integrating networks connected to a nonconducting one of said amplifying devices, said means including a third and fourth diode, a cathode load resistor connected to the cathode of said first amplifying tube, a cathode load resistor connected to the cathode of said second amplifying tube, said third diode being connected between said first amplifier tube cathode and the input to said first integrating network, said fourth diode being connected between said second amplifier tube cathode and the input to said second integrating network, and means for maintaining the one of the third and fourth diodes connected to a nonconductive amplifier tube conductive while the diode connected to the conductive amplifier tube is maintained nonconductive.

No references cited.